United States Patent
Polak

[11] 3,903,755
[45] Sept. 9, 1975

[54] GAS TURBINE ENGINE AND HYDROMECHANICAL TRANSMISSION VEHICLE DRIVE

[75] Inventor: James C. Polak, Indianapolis, Ind.

[73] Assignee: General Motors Corporation, Detroit, Mich.

[22] Filed: Dec. 10, 1973

[21] Appl. No.: 423,440

Related U.S. Application Data
[63] Continuation-in-part of Ser. No. 381,045, July 20, 1973, abandoned.

[52] U.S. Cl................................. 74/687; 74/789
[51] Int. Cl....................... F16h 47/04; F16h 57/10
[58] Field of Search ......... 74/687, 677, 720.5, 731, 74/732, 789

[56] References Cited
UNITED STATES PATENTS

| | | | |
|---|---|---|---|
| 2,936,653 | 5/1960 | Quistgaard et al. | 74/731 X |
| 3,383,954 | 5/1968 | McFarland | 74/789 X |
| 3,592,077 | 7/1971 | Polak | 74/687 |
| 3,597,998 | 8/1971 | Ebert | 74/687 |
| 3,777,593 | 12/1973 | Mooney, Jr. et al. | 74/687 |

*Primary Examiner*—Samuel Scott
*Assistant Examiner*—P. S. Lall
*Attorney, Agent, or Firm*—Donald F. Scherer

[57] ABSTRACT

A gas turbine engine, of the free power turbine type, and a controlled hydromechanical transmission are combined to provide a vehicle power drive system. The hydromechanical transmission is arranged to provide one of two mechanical drive paths from the free power turbine to the transmission output. The other path is through a mechanical clutch. The two paths combine at a planetary system, the ring gear of which drives the output shaft. On start, the high stall torque characteristic of the engine is used in direct mechanical drive with the planetary locked out for initial tractive effort and to accelerate up to a predetermined engine and vehicle speed. To achieve a higher speed, the planetary is released and the hydrostatic drive acts on the planetary to define a step up drive. The hydrostatic drive includes servo elements responsive to its transmitted torque and affective to vary the hydrostatic drive ratio in amount and sense to maintain predetermined torque therethrough. In consequence, the hydrostatic drive varies, in effect, the speed-torque characteristic of the overall drive in a manner defining a series of the same general shape as the turbine characteristic.

4 Claims, 4 Drawing Figures

GAS TURBINE ENGINE AND HYDROMECHANICAL TRANSMISSION VEHICLE DRIVE

This is a Continuation-in-Part of Ser. No. 381,045, filed July 20, 1973, now abandoned.

This invention relates to vehicle drive systems and more particularly to vehicle drive systems having a free turbine engine and a hydromechanical transmission.

Prior art hydromechanical transmissions provide a low speed drive range which is fully a hydrostatic drive, wherein all of the engine power is transmitted to the vehicle wheels through the positive displacement hydraulic units. This requires that the hydraulic units be sufficiently large in displacement to accommodate the maximum output torque of the engine.

The present invention utilizes a mechanical drive in a low drive range, between the gas turbine engine output and the transmission output, such that, at maximum engine torque, the hydrostatic units are unloaded. The hydrostatic units are then manipulated to provide a parallel drive to the transmission output in a higher vehicle speed range. In the higher vehicle speed ranges, which are accompanied by lower engine output torques, the hydrostatic units transmit only a portion of the engine output power. Therefore, the hydrostatic units can be of smaller displacement and still accommodate the torque which they must transmit.

The hydromechanical drives are accomplished by using selectively engageable clutches and brakes to control the transmission of power. A simple planetary gear set is used to combine the mechanical drive and the hydrostatic drive. When a mechanical drive is desired, the planetary gear set is conditioned for lockup, by a clutch, and the engine is clutched directly to the transmission output shaft through the locked up planetary set. To establish a hydromechanical drive, the clutch locking the planetary set is disengaged. Immediately before and after the planetary clutch is disengaged, the hydraulic motor is rotating at the speed of the input. Thus the shift to and from the hydromechanical drive is synchronized. In the hydromechanical drive, one member of the planetary set is connected through a clutch to the engine, while a second member of the planetary set is drivingly connected to a member of the hydrostatic transmission.

Reverse drives may be accomplished by utilizing a brake on one member of the planetary gear set to provide a fully hydrostatic drive in the transmission, or by incorporating a forward-reverse gear set between the engine output and the transmission input, both the forward and reverse drives are mechanical in low range and hydromechanical in high range.

The hydrostatic transmission ratio is controlled by servo devices. The ratio is controlled in such a manner that, during the hydromechanical high range, the output speed-torque characteristic defines a substantially constant power output. Thus in the high range the engine speed and torque remain constant while the transmission output speed-torque characteristic is varied by the hydrostatic transmission.

It is an object of this invention to provide an improved variable speed power drive system for a vehicle in which the high stall torque of a free turbine engine can be utilized to provide the initial drive range, and a variable ratio hydrostatic transmission is engaged in parallel with the free turbine to provide a hydromechanical higher drive range, and the ratio thereof is varied to provide a substantially continuous and smooth output speed-torque characteristic.

Another object of this invention is to provide an improved gas turbine and hydromechanical transmission combination in which the low speed drive range is established directly between the engine output and the transmission output to provide an efficient low speed range having high stall tractive effort, and a hydrostatic transmission is utilized to provide a high drive range wherein the hydrostatic drive is in parallel with the engine mechanical drive, and a planetary gear set is used to combine the mechanical and hydrostatic drive.

Another object of this invention is to provide an improved gas turbine engine and hydromechanical transmission wherein the initial drive is a pure mechanical drive and the extended speed range is a hydromechanical drive and wherein the maximum displacement of the hydrostatic drive components is substantially reduced below the displacement required to transmit maximum engine torque and wherein the hydrostatic drive ratio is controlled to provide a transmission output speed-torque characteristic of substantially constant power during the extended speed range.

These and other objects of the present invention will be more apparent from the following description and drawings in which.

Figure 1:
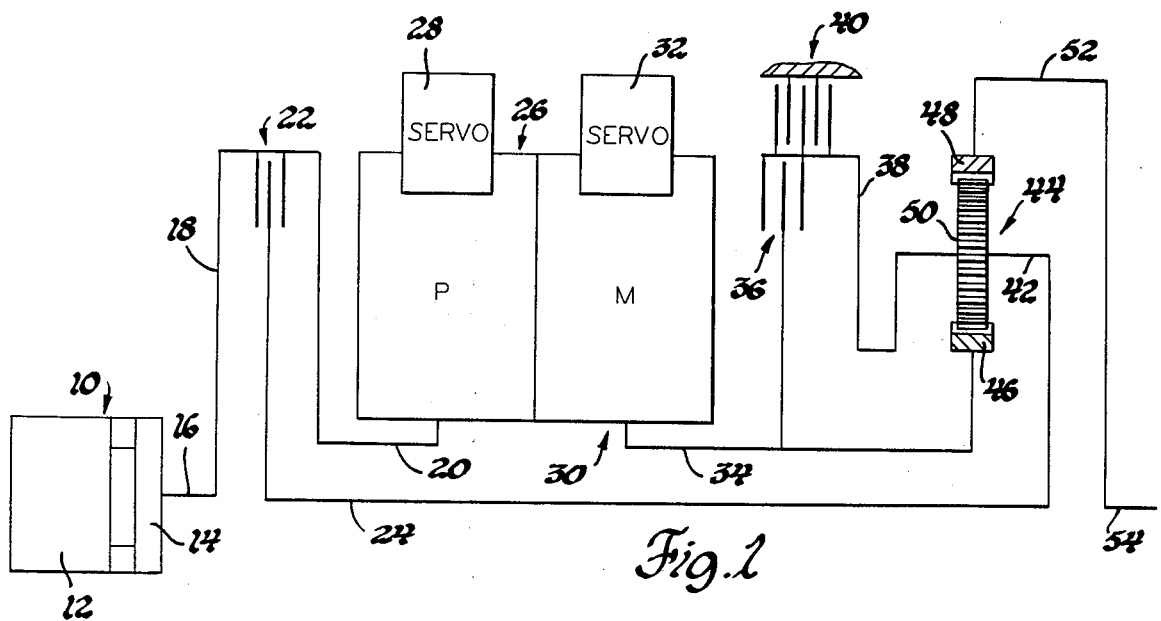
FIG. 1 is a schematic representation of one embodiment of the invention.

Referring to the drawings there is shown in FIG. 1 a gas turbine engine 10 having a gasifier section 12 and a free turbine section 14. With this type of engine, the gasifier section 12 can operate independently of the free turbine 14 such that the free turbine 14 can be stalled. In the stalled condition the free turbine 14 produces maximum output torque.

The free turbine 14 is drivingly connected to an output shaft 16 which is drivingly connected through a hub 18 to a pump input shaft 20. The hub 18 is also drivingly connected to the input portion of a clutch 22, the output of which is drivingly connected to a shaft 24.

The pump shaft 20 is drivingly connected to a hydraulic pump 26 which is preferably constructed in a manner similar to that shown in U.S. Pat. No. 3,274,946 issued to Simmons on Sept. 27, 1966. The pump 26 is a variable displacement type pump having a servo control mechanism 28 which is utilized to control the displacement of the pump 26. The servo control 28 may be constructed in accordance with any of the well known servo controls utilized to control hydraulic pumps and motors including power limiting type actuators such as that shown in U.S. Pat. No. 3,495,405 issued to J. R. Marlow Feb. 17, 1970 for preventing engine overload.

Figure 3:
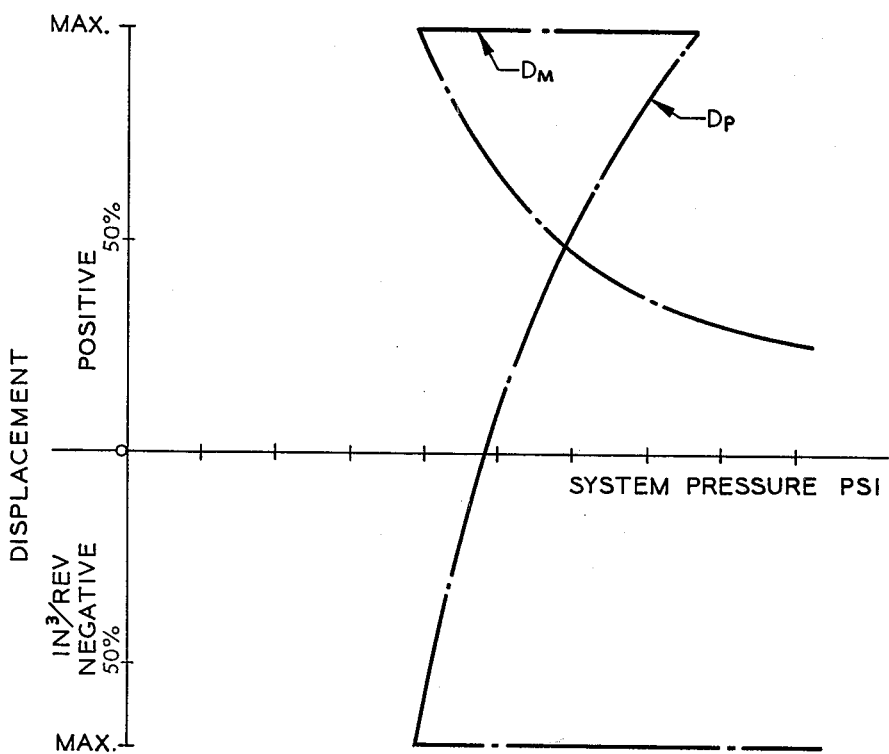
FIG. 3 is a graph of hydraulic unit displacement versus system pressure.

The pump 26 is in fluid communication with a hydraulic motor 30, which may also be constructed in accordance with the above U.S. Pat. No. 3,274,946. The motor 30 is also preferably of the variable displacement type having a conventional servo control mechanism 32 similar to servo 28. The servo controls 28 and 32 are preferably manually operated and interconnected to provide a programmed displacement control as shown in FIG. 3. The input movement of the control initially changes pump displacement, as shown in FIG. 3, and then changes motor displacement. The engine power limit feature overrides the manual control to provide the necessary change in pump and/or motor displacement to prevent engine overload as described in the above Marlow. The present use of the power limiter and servos differ from Marlow in that the present pump displacement is controlled from the maximum positive position toward the maximum negative position rather than from the neutral or zero displacement position toward positive or negative displacements. The motor 30 has an output shaft 34 which is drivingly connected to a portion of a clutch mechanism 36. Another portion of the clutch mechanism 36 is connected to a hub 38, which hub 38 is also operatively connected to a brake 40. The clutches 22 and 36 and the brake 40 are preferably of the selectively operable fluid operated type friction drive establishing devices incorporating a plurality of disc members.

The shaft 24 is drivingly connected to a carrier 42 which is a component of a simple planetary gear set 44. The planetary gear set 44 also includes a sun gear 46, which is drivingly connected to the motor shaft 34, a ring gear 48, and a plurality of pinion gears 50 which are rotatably mounted on the carrier 42 in meshing relationship with the sun gear 46 and ring gear 48. The carrier 42 is also drivingly connected with the hub 38. The ring gear 48 is drivingly connected through a hub 52 with a transmission output shaft 54 which is adapted to drive a vehicle final drive system, not shown.

The pump 26 and motor 30 cooperate to provide a hydrostatic transmission. The drive ratio in the hydrostatic transmission can be varied by varying the displacement of the pump 26, the displacement of motor 30, or the displacement of both the pump 26 and motor 30. For the purpose of the following description of operation, it is assumed that the pump 26 and the motor 30 have maximum displacement of 8 cubic inches, it is also assumed that maximum pressure permissible in the hydrostatic transmission is 6000 PSI. The pump may be stroked either side of center to provide reversible flow. With the present state of the art in hydraulic pumps and motors, 6000 PSI is substantially the maximum system pressure that can be utilized in hydraulic units which would be economically feasible for use in vehicle propulsion systems. When a pressure of 6000 PSI is supplied to the motor 30, the maximum theoretical torque output of the motor 30 would be 638 foot-pounds. Also at 6000 PSI, and a pump displacement of 8 cubic inches, the maximum theoretical input torque that can be absorbed by the pump is 638 foot-pounds. It is also assumed for the following description of operation that the maximum output torque of the free turbine engine 10 is 1415 foot-pounds, when the free turbine is in a stalled condition. The engine 10 has an output torque of approximately 700 foot-pounds at its design output speed. Thus, it can be seen that the hydrostatic units 26 and 30 are not capable of transmitting the maximum output torque of the engine 10.

With the engine 10 at an idling condition and clutches 22 and 36 and brake 40 disengaged, the transmission will be in a neutral condition. In the neutral condition, if a forward drive is to be established, the servo controls 28 and 32 are operated to condition the pump 26 and motor 30 to maximum displacements. To establish the forward drive, the clutches 22 and 36 are simultaneously engaged, thus providing a direct drive connection between the engine shaft 16 and the transmission shaft 54, since the planetary gear set 44 will be in a locked up condition. Assuming the engine output torque at idle is not sufficient to drive the vehicle, the free turbine 14 will stall. With the free turbine 14 stalled, the engine output torque is at a maximum for a given throttle setting. To increase the vehicle speed, in a forward direction, the engine throttle is increased, thereby increasing output torque and tractive effort. This will permit the operator to control the acceleration of the vehicle through the manipulation of the throttle. Since the pump 26 and motor 30 have the same displacements, they will rotate in unison, the pump being driven by engine shaft 16 and the motor being driven by the motor shaft 34. Since no pressure can be developed in the hydrostatic transmission at this time, no load will be transmitted through the hydrostatic transmission. Thus, the vehicle speed is increased directly proportional to engine output speed, which continues until the design speed of the gas turbine 10 is reached.

When the design speed of the gas turbine engine is achieved, the clutch 36 is disengaged. When the clutch 36 is disengaged, the sun gear 46 will tend to accelerate, which would result in an increase in speed in the motor 30. Since the motor 30 must rotate at substantially the same speed as the pump 26, the hydraulic system pressure will increase. The motor 30 at this time will become a rotating reaction member in the transmission. With the engine speed remaining constant, a further increase in transmission output speed is produced by decreasing the displacement of the pump 26 through the manual manipulation of servo control 28 subject to the constraint of the power limiter. As the pump displacement decreases the motor speed will also decrease, thereby decreasing the speed of sun gear 46 which will result in an increase in speed of the ring gear 48 which drives the output shaft 54. When the displacement of the pump 26 is zero, the speed of the motor 30 will be substantially zero, thereby providing a mechanical overdrive condition between the engine shaft 16 and the output shaft 54, through the planetary gear set 44. A further increase in transmission output speed is provided by increasing the displacement of the pump 26 in the opposite or negative direction. This will result in a rotation of the motor 30 in the opposite direction, which will result in the sun gear 46 being driven in a direction opposite to the ring gear 48. As is known, under this condition, the ring gear speed will increase in a forward direction as the sun gear speed increases in a reverse direction. The hydromechanical range is of the output split type and is an overdrive speed range.

When the pump 26 has been conditioned for substantially maximum negative displacement, the motor displacement can be decreased thereby providing a further increase and the speed of the sun gear 46 in the reverse direction, such that a ring gear 48 will increase in speed.

A reverse drive is also provided in the transmission. With the transmission again in neutral, the displacement of pump 26 is placed at zero and the brake 40 is engaged. With the pump displacement at zero and both clutches 22 and 36 disengaged, the engine will idle with the free turbine rotating at idle speed. To increase the vehicle speed from zero, the displacement of pump 26 is increased thereby causing the motor 30 to rotate. The motor 30 drives the sun gear 46 which in turn drives the ring gear 48 in a reverse direction since the carrier 42 is held stationary by the brake 40. This is a hydrostatic drive condition, and the maximum torque transmitted is limited by the size of the hydraulic units 26 and 30 and system pressure such that maximum engine torque can not be transmitted. However, by utilizing the torque multiplication of planetary set 44, the maximum output torque in reverse is substantially equal to forward. System pressure can be controlled by a conventional regulator valve or a conventional pressure compensator incorporated into the servo control. However, in many vehicles such as earth movers, bull dozers, and busses, a high output torque reverse drive is not required. Thus, the transmission of FIG. 1 can be utilized in such vehicles.

From the above description, it will be appreciated that the low speed drive range is a purely mechanical drive which is, of course, more efficient than a hydromechanical or hydrostatic drive. The vehicle speed range is extended to include a high speed range through the use of the hydrostatic drive in parallel with the mechanical drive to provide a hydromechanical overdrive. This high speed range however, occurs at lower engine output torques, and since the hydrostatic portion of the transmission transmits only a portion of the power transmitted, the efficiency therein is maintained at a relatively high value. It can also be seen from the above description that the range change from a mechanical to hydromechanical drive is substantially synchronized.

During the hydromechanical overdrive speed range, the hydrostatic transmission ratio is controlled to provide a substantially constant power output. This is accomplished by controlling the hydraulic system pressure and the displacements of the pump 26 and motor 30 in accordance with the following chart:

| Np | Dp | Dm | Nm | P | Tm | No | To |
|---|---|---|---|---|---|---|---|
| 0 | — | — | 0 | — | — | — | 1415 |
| 1300 | 8 | 8 | 1300 | — | — | 1300 | 700 |
| 1300 | 8 | 8 | 1300 | 3800 | 400 | 1300 | 700 |
| 1300 | 4 | 8 | 650 | 2950 | 315 | 1650 | 550 |
| 1300 | 0 | 8 | 0 | 2400 | 260 | 2025 | 450 |
| 1300 | −6 | 8 | −977 | 1900 | 200 | 2600 | 350 |
| 1300 | −6 | 6 | −1300 | 2300 | 180 | 2850 | 320 |
| 1300 | −6 | 4 | −2600 | 2800 | 150 | 3500 | 260 |
| 1300 | −6 | 2 | −3900 | 4650 | 125 | 4150 | 220 |

Np = Pump Speed RPM     P = System Pressure PSI
Dp = Pump Disp. In 3/Rev     Tm = Motor Torque Ft Lbs
Dm = Motor Disp In 3/Rev     No = Output Speed RPM
Nm = Motor Speed RPM     To = Output Torque Ft Lbs As can be observed from the chart, the product of output speed and output torque is substantially constant when the hydrostatic units are working.

Figure 4:
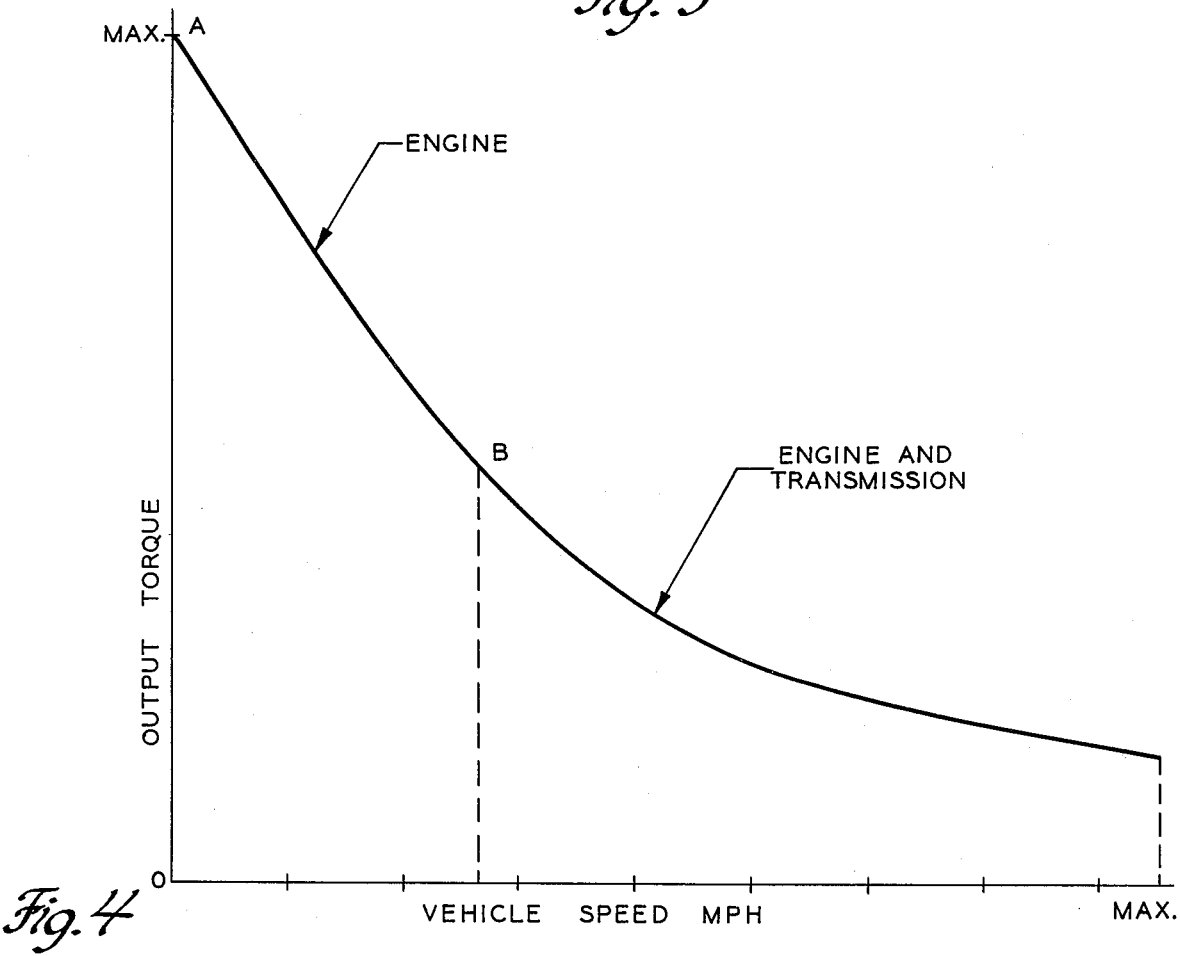
FIG. 4 is a graph of transmission output torque versus transmission vehicle speed.

The general shape of displacement versus pressure curves for the pump and motor are shown in FIG. 3. FIG. 4 shows the relationship of output torque to output speed for the entire operating range of the transmission. From point A to point B on the curve of FIG. 4, the drive is directly from the engine to the transmission output. From point B to the maximum vehicle speed, the drive is of the hydromechanical output split type and defines a substantially constant power output. That is, the engine power remains constant from point B to maximum vehicle speed. From point A to point B, the transmission output power is equal to the engine output power which, of course, is dependent on engine design.

Figure 2:
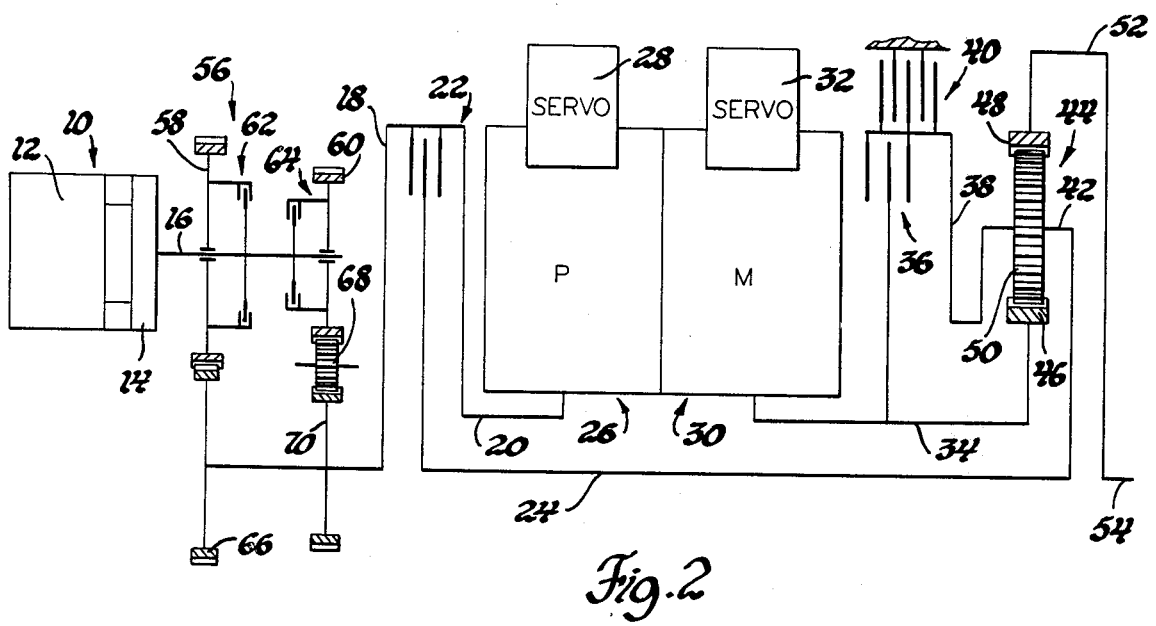
FIG. 2 is a schematic drawing of another embodiment of the invention.

The transmission shown in FIG. 2 is substantially the same as the transmission shown in FIG. 1, therefore the corresponding parts of the transmission in FIG. 2 have been given the same numerical designation and will not be redescribed. The significant difference between the transmission of FIG. 1 and the transmission of FIG. 2 is the addition of a forwardreverse gear set generally designated 56 which is disposed between the engine output shaft 16 and the hub 18. The forward-reverse gear set 56 includes a pair of spur gears 58 and 60 rotatably mounted on the engine output shaft 16 which gears may be selectively clutched thereto by friction clutches 62 and 64 respectively. The gear 58 meshes with a gear 66 which is drivingly connected to the hub 18, and the gear 60 meshes with an idler gear 68 which in turn meshes with a gear 70 drivingly connected to the hub 18. The engagement of one clutch, for example clutch 64, will cause the hub 18 and therefore shafts 20 and 24 thereby driven in one direction which for the purpose of this disclosure will be considered the forward direction, since the rotation of shafts 20 and 24 in FIG. 2 will be consistent with the rotation of the corresponding shafts in FIG. 1 under this condition. The engagement of clutch 62 will cause the opposite rotation of hub 18 and therefore shafts 20 and 24. Thus, it can be seen that the same transmission drive ranges can be provided in both a forward and reverse direction. Thus, the transmission embodiments shown in FIG. 2 could be used with vehicles which require high starting torques in both the forward and reverse direction of operation. A forward-reverse planetary gearing can also be used in place of the spur gears.

Both of the transmissions shown in FIGS. 1 and 2 can be conditioned for drive ranges other than those described above, that is the mechanical low drive range and the hydromechanical high drive range. By engagement of the brake 40, it was discussed for FIG. 1 above that a reverse drive could be established. Also with engagement of the brake 40 and the selective manipulation of the servo 28 a forward drive range can be provided since the rotation of sun gear 46 under this condition is determined by whether the displacement of pump 26 is in a positive or negative direction. If clutch 36 is engaged while brake 40 and clutch 22 are disengaged, a second hydrostatic drive range is provided to drive between the motor output shaft 34 and the transmission output shaft 54. This hydrostatic drive can of course also be either a forward or reverse drive depending on the displacement of pump 26. These drives can be used to provide additional versatility depending upon the vehicle into which the drive system is incorporated. For example, the pure hydrostatic drives can be used for creep control, very low output speed, while the engine is operated at a high throttle condition to drive accessories, such as the hydraulic pump and linear hydraulic motors of a lift truck, or a loader.

Obviously, many modifications and variations of the present invention are possible in light of the above teachings. It is, therefore, to be understood that within the scope of the appended claims the invention may be practiced otherwise than as specifically described.

What is claimed is:

1. A power drive system for a vehicle comprising, a gas turbine engine having free turbine output means operable through a speed range for providing variable output torques and speed and having a maximum output torque at zero output speed; a variable ratio hydrostatic transmission including variable displacement pump means and motor means each having a maximum displacement and pressure limitation for limiting the torque transmission of said hydrostatic transmission at a value less than said maximum output torque of said free turbine output means; drive means disposed between said free turbine output means and said hydrostatic transmission for providing a drive relationship therebetween; transmission output means for delivering power from said drive system; planetary gear means including a sun gear drivingly connected with said hydrostatic transmission, a ring gear drivingly connected with said transmission output means, a carrier member, and pinion gear means rotatably mounted on said carrier member and meshing with said sun and ring gear; first selectively engageable clutch means for connecting said sun gear and said carrier member together; second selectively engageable clutch means for connecting said drive means and said carrier member together and cooperating with said first clutch means for providing a low speed drive range which transmits engine torque directly from said drive means to said transmission output means through a mechanical drive path only; and servo means for varying the displacement of said pump means for controlling said pump and motor displacements at equal values when both said clutch means are engaged and said pump means and motor means are rotated in unison when the mechanical drive path having a speed-torque characteristic substantially equal to the engine speed torque characteristic is provided and for varying the displacement of said pump relative to the displacement of said motor when said first clutch means is disengaged and said second clutch means is engaged to provide a hydromechanical high speed drive range defining a substantially continuous output speed-torque characteristic.

2. A variable speed power drive system for a vehicle comprising a free turbine gas turbine engine having free turbine output means for providing a power output therefrom through a speed range including zero output speed and a torque range having a maximum torque at zero output speed; a hydromechanical transmission including a variable ratio hydrostatic transmission having a variable displacement pump, a motor and means for controlling the displacement of said variable displacement pump, first continuous drive means connected between said free turbine output means and said pump for providing a continuous drive therebetween, planetary gear means including a sun gear, a ring gear, a carrier member and pinions rotatably mounted on said carrier member meshing with said sun and ring gears, second continuous drive means connected between said motor and said sun gear, first selectively engageable clutch means disposed between said first continuous drive means and said carrier member for providing a selective drive connection therebetween to establish a forward low range mechanical drive in said system, second selectively engageable clutch means between said second continuous drive means and said carrier member for providing a selective drive connection therebetween when the low forward drive range is desired and said pump displacement is equal to the motor displacement to provide a mechanical only drive path which has a speed-torque characteristic substantially equal to the engine speed-torque characteristic, selectively engageable brake means for preventing rotation of said carrier member when a reverse drive range is desired and both said clutch means are disengaged, said second clutch means being disengaged and said first clutch means remaining engaged to provide a second and high forward drive range having a mechanical component from said free turbine output means and a hydrostatic component from said hydrostatic transmission to provide a hydromechanical high speed drive range having a speed-torque characteristic defining a substantially constant power output; and output means continuously connected with said ring gear to deliver the drives from said hydromechanical transmission.

3. A variable speed power drive system for a vehicle comprising a free turbine gas turbine engine having free turbine output means for providing a power output therefrom through a speed range including zero output speed and a torque range having a maximum torque at zero output speed; a hydromechanical transmission including a variable ratio hydrostatic transmission having a variable displacement pump, a variable displacement motor and means for controlling the displacement of each of said variable displacement pump and motor, forward-reverse drive means connected between said free turbine output means and said pump for selectively providing forward and reverse drives therebetween, planetary gear means including a sun gear, a ring gear, a carrier member and pinions rotatably mounted on said carrier member meshing with said sun and ring gears, drive means connected between said motor and said sun gear, first selectively engageable clutch means disposed between said forward-reverse drive means and said carrier member for providing a selective mechanical only drive path connection therebetween to establish a forward and a reverse low range in said system having a speed-torque characteristic substantially equal to the engine speed-torque characteristic, second selectively engageable clutch means between said drive means and said carrier member cooperating with said first clutch means for providing the selective mechanical only drive connection therebetween when the low forward drive range is desired and said pump displacement is equal to the motor displacement, said second clutch means being disengaged and said first clutch means remaining engaged to provide a second and high forward and reverse drive range having a mechanical component from said free turbine output means and a hydrostatic component from said hydrostatic transmission to provide a hydromechanical high speed drive range having a speed-torque characteristic defining a substantially constant power output; and output means continuously connected with said ring gear to deliver the drives from said hydromechanical transmission.

4. A variable speed power drive system for a vehicle comprising a free turbine gas turbine engine having free turbine output means for providing a power output therefrom through a speed range including zero output speed and a torque range having a maximum torque at zero output speed; a hydromechanical transmission including a variable ratio hydrostatic transmission having a variable displacement pump, a variable displacement motor and means for controlling the displacement of each of said variable displacement pump and motor, forward-reverse drive means connected between said free turbine output means and said pump for selectively providing forward and reverse drives therebetween, planetary gear means including a sun gear, a ring gear, a carrier member and pinions rotatably mounted on said carrier member meshing with said sun and ring gears, drive means connected between said motor and said sun gear, first selectively engageable clutch means disposed between said forward-reverse drive means and said carrier member for providing a selective drive connection therebetween to establish a forward and a reverse low range mechanical drive in said system, second selectively engageable clutch means between said drive means and said carrier member cooperating with said first clutch means for providing a selective mechanical only drive connection therebetween when the low forward drive range is desired and said pump displacement is equal to the motor displacement, said second clutch means being disengaged and said first clutch means remaining engaged to provide a second and high forward and reverse drive range having a mechanical component from said free turbine output means and a hydrostatic component from said hydrostatic transmission; and output means continuously connected with said ring gear to deliver the drives from said hydromechanical transmission.

* * * * *